United States Patent [19]

Barringer, Jr. et al.

[11] Patent Number: 5,563,231
[45] Date of Patent: Oct. 8, 1996

[54] CAPPED SILANES AND THEIR APPLICATION TO TEXTILE SUBSTRATES

[75] Inventors: Lloyd Barringer, Jr., Rock Hill, S.C.; Thomas P. Bellina, Charlotte, N.C.; Brad A. Ziegler, Rock Hill, S.C.

[73] Assignee: Bayer Corporation, Pittsburgh, Pa.

[21] Appl. No.: 471,808

[22] Filed: Jun. 6, 1995

[51] Int. Cl.$^6$ ............................................. C08G 77/04
[52] U.S. Cl. .................. 528/26; 556/457; 556/425; 556/419; 556/459; 528/265; 528/29; 528/30; 528/31; 528/33; 528/34; 528/38
[58] Field of Search .................. 556/457, 459, 556/425, 419; 528/33.31, 34, 38, 29, 26, 26.5, 30

[56] References Cited

U.S. PATENT DOCUMENTS

| | | | |
|---|---|---|---|
| 3,294,739 | 12/1966 | Weyenberg | 556/459 |
| 3,511,699 | 5/1970 | Johnson et al. | 117/135.5 |
| 3,859,321 | 1/1975 | Traver | 260/448.2 B |
| 4,110,503 | 8/1978 | Ogawa et al. | 428/64 |
| 4,725,658 | 2/1988 | Thayer et al. | 528/15 |
| 4,824,983 | 4/1989 | Fink et al. | 556/457 |
| 5,226,923 | 7/1993 | O'Lenick, Jr. | 8/115.6 |
| 5,254,134 | 10/1993 | Zhao et al. | 8/120 |
| 5,277,968 | 1/1994 | Canivenc | 428/245 |
| 5,334,372 | 8/1994 | Kawamata et al. | 424/78.03 |
| 5,395,549 | 3/1995 | Ozaki et al. | 252/174 |

FOREIGN PATENT DOCUMENTS

| | | |
|---|---|---|
| 4-011079 | 1/1992 | Japan. |
| 4-011081 | 1/1992 | Japan. |
| 837873 | 10/1983 | South Africa. |
| 1130074 | 10/1968 | United Kingdom. |

OTHER PUBLICATIONS

"Silwet Surfactants", Union Carbide (1982).

*Primary Examiner*—Melvyn I. Marquis
*Attorney, Agent, or Firm*—Joseph C. Gil; Richard E. L. Henderson

[57] ABSTRACT

This invention relates to water-dispersible compounds that are useful as lubricants for textile wet processing having formula (I):

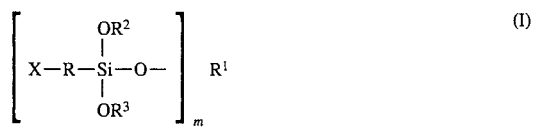

wherein

R is $C_1$–$C_{10}$ alkylene;

$R^1$ is an m-functional group having the formula $[OSi(R^5R^6)]_n$—Z—(O—B)$_s$—OR$^4$—(A—O)$_r$—Y—Si—R$^5$
$[OSi(R^5R^6)]_p$—Z—(O—B)$_s$—OR$^4$;

$R^2$ and $R^3$ are independently $C_1$–$C_{10}$ alkyl or groups having the formula $[OSi(R^7R^8)]_n$—Z—(O—B)$_s$—OR$^4$—(A—O)$_r$—Y—Si—R$^7$
$[OSi(R^7R^8)]_p$—Z—(O—B)$_s$—OR$^4$;

$R^4$ is hydrogen, acyl, or trialkylsilyl;

$R^5$ and $R^6$ are independently alkyl, alkoxy, —Z—(O—B)$_s$—OR$^4$, or —Y—(O—A)r—;

$R^7$ and $R^8$ are independently alkyl, alkoxy, or —Z—(O—B)$_s$—OR$^4$;

X is hydrogen, (cyclo)alkyl, (cyclo)alkenyl, —NR$^c$R$^d$, —NR$^c$R$^d$R$^{e+}$Q$^-$, —OR$^f$, —SR$^g$, —NH—CO—NH—R$^h$, —O—CO—NH—R$^i$, —NH—CO—O—R$^j$, —CN, or halogen;

A and B are independently alkylene;

Y and Z are independently a direct bond or alkylene;

m is from 1 to 20;

r and s are independently from 0 to 20; and n and p are from 0 to 100 and the total (n+p) is from 10 to 100.

7 Claims, No Drawings

CAPPED SILANES AND THEIR APPLICATION TO TEXTILE SUBSTRATES

BACKGROUND OF THE INVENTION

The present invention relates to the preparation of silane compounds that are useful as lubricants for textile wet processing.

Many lubricants that can be employed in textile wet processing are available. Such lubricants include naturally occurring oils, such as castor oil, paraffinic or naphthenic oils that primarily consist of hydrocarbons, and sulfonated derivatives thereof, and a multitude of synthetic lubricants, such as known polyacrylates, polyacrylamides, silicones, and the like. The present invention relates to the preparation of a subclass of the synthetic silane lubricants.

Synthetic polysiloxanes, including those containing polyether and/or amine residues, are known to be useful as lubricants for textile processing. E.g., U.S. Pat. Nos. 3,511,699, 5,254,134, 5,226,923, 5,277,968, and 5,395,549 and Japanese Patents 4011079 and 4011081.

Silanols, or silanes bearing primary hydroxyl groups, can undergo reactions similar to those of primary organic alcohols. Consequently, various acyl derivatives can often be prepared. For example, British Patent 1,130,074 discloses relatively low molecular weight acyloxysiloxanes in which silicon atoms are substituted with R—CO—O— groups in which R is a $C_1$–$C_3$ alkyl group. The disclosed organosiloxanes cure in the presence of atmospheric moisture to form solid elastomers. Textile applications are not disclosed.

Acylated organosiloxanes having other organic groups are also known for use in non-textile applications. For example, U.S. Pat. No. 4,725,658 discloses silicone ester waxes in which the silicon atoms are substituted with ester-containing fatty acid groups having at least 12 carbon atoms. The disclosed silicone ester derivatives are used in various cosmetic compositions. U.S. Pat. No. 4,110,503 discloses structurally similar compounds that are used to provide lubricity to magnetic recording media. U.S. Pat. No. 3,859,321 discloses polyethersubstituted silicone polymers that are useful as brake fluids. South African Patent Application 837,873 discloses various end-capped room temperature vulcanizable ("RTV") silicone rubbers.

U.S. Pat. No. 5,334,372 discloses silicone ester derivatives in which at least some of the silicon atoms are substituted with groups having the general formula RCO—(OCH$_2$CH$_2$)$_x$—O—(CH$_2$)$_3$— in which R is an aromatic or hydrocarbon group derived from carboxylic acids such as acetic and stearic acids. The disclosed compounds are described as useful in cosmetic compositions to provide lubricity, water repellency, gloss, stability, and product safety. Textile applications are not disclosed.

U.S. Pat. No. 5,226,923 discloses alcohol-modified silicone fatty esters in which at least some of the silicon atoms are substituted with groups having the general formula RCO—(EO)$_c$—(PO)$_b$—(EO)$_a$—O—(CH$_2$)$_3$— in which R is $C_{11}$–$C_{20}$ alkyl, EO is an ethylene oxide residue, and PO is a propylene oxide residue. The disclosed silicone fatty esters are used for softening and lubricating hair, skin, and textiles to provide improved antistatic properties, substantivity, and resistance to discoloration. However, such silicone fatty esters have relatively low affinity toward cellulosic substrates and may not have sufficient electrolyte stability for some dyeing applications.

Although the references mentioned above disclose the use of modified silanols in a variety of applications, the compounds of the present invention, particularly the alkoxylated compounds, have been not been described. The compounds of the present invention are particularly advantageous for promoting different substantivities toward selected textile substrates and enhanced stabilities in various media commonly used in textile processing.

Furthermore, the preferred silane intermediates used in the preparation of the compounds of the invention are especially useful in inhibiting or preventing undesired crosslinking, polymerization, and hydrolysis for siloxy-containing species bearing more than one primary hydroxyl group.

SUMMARY OF THE INVENTION

The present invention relates to water-dispersible compounds that are useful as lubricants for textile wet processing having formula (I):

$$\left[ \begin{array}{c} OR^2 \\ | \\ X-R-Si-O- \\ | \\ OR^3 \end{array} \right]_m R^1 \quad (I)$$

wherein

R is $C_1$–$C_{10}$ alkylene (preferably 1,3-propylene);

$R^1$ is an m-functional linear or branched polymeric siloxy-containing group having the formula

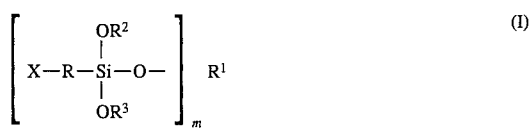

$R^2$ and $R^3$ are independently $C_1$–$C_{10}$ alkyl or linear or branched polymeric siloxy-containing groups having the formula

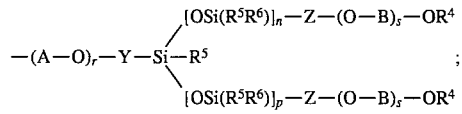

with the proviso that at least one of $R^2$ and $R^3$ is not $C_1$–$C_{10}$ alkyl, or $R^2$ and $R^3$ taken together are —(CR$^a$R$^b$)$_q$— (wherein $R^a$ and $R^b$ are independently hydrogen or $C_1$–$C_6$ alkyl, and q is 2, 3, or 4);

$R^4$ is hydrogen, formyl, $C_2$–$C_{30}$ alkanoyl, $C_3$–$C_{30}$ alkenoyl, $C_7$–$C_{11}$ aroyl (optionally substituted in one or more aromatic rings), or tri($C_1$–$C_6$ alkyl)silyl (preferably trimethylsilyl);

$R^5$ and $R^6$ are independently $C_1$–$C_6$ alkyl, $C_1$–$C_6$ alkoxy, —Z—(O—B)$_s$—OR$^4$, or —Y—(O—A)$_r$— (with the proviso that the total number of —Y—(O—A)$_r$— groups in compounds of formula (I) equals m);

$R^7$ and $R^8$ are independently $C_1$–$C_6$ alkyl, $C_1$–$C_6$ alkoxy, or —Z—(O—B)$_s$—OR$^4$, X is hydrogen, $C_1$–$C_6$ alkyl, $C_2$–$C_6$ alkenyl, $C_5$–$C_7$ cycloalkyl, $C_5$–$C_7$ cycloalkenyl, —NR$^c$R$^d$ (wherein R$^c$ and R$^d$ are independently hydrogen, $C_1$–$C_6$ alkyl, or $C_5$–$C_7$ cycloalkyl), —NR$^c$R$^d$R$^{e+}$ Q$^-$ (wherein R$^c$, R$^d$, and R$^e$ are independently hydrogen, $C_1$–$C_6$ alkyl, or $C_5$–$C_7$ cycloalkyl and Q$^-$ is an anion), —OR$^f$ (wherein R$^f$ is hydrogen, $C_1$–$C_6$ alkyl, or $C_5$–$C_7$ cycloalkyl), -SR$^g$ (wherein R$^g$ is hydrogen, $C_1$–$C_6$ alkyl, or $C_5$–$C_7$ cycloalkyl), —NH—CO—NH—R$^h$ (wherein R$^h$ is hydrogen, $C_1$–$C_6$ alkyl, or $C_5$–$C_7$ cycloalkyl), —O—CO—NH—R$^i$ (wherein R$^i$ is hydrogen, $C_1$–$C_6$ alkyl, or $C_5$–$C_7$ cycloalkyl), —NH—CO—O—$R^j$ (wherein $R^j$ is hydrogen, $C_1$–$C_6$ alkyl, or $C_5$–$C_7$ cycloalkyl), —CN, or halogen;

A and B are independently $C_1$–$C_4$ alkylene;

Y and Z are independently a direct bond or $C_1$–$C_4$ alkylene (preferably 1,3-propylene);

m is an integer of from 1 to about 20 (preferably 1);

r and s are independently an integer of from 0 to about 20; and n and p are each integers of from 0 to about 100 with the proviso that the total (n+p) is from about 10 to about 100 (preferably 20 to 100, more preferably from 30 to 50).

The invention further relates to the use of such compounds as lubricants for textile wet processing.

DETAILED DESCRIPTION OF THE INVENTION

Suitable linear or branched polymeric siloxy-containing groups include polymeric chains containing repeating siloxy units. The m-functional group $R^1$ is preferably monofunctional (in the sense that m as defined for formula (I) is 1). However, although generally less preferred, it is also possible to use higher functionality groups $R^1$ in which the total number of —(A—O)$_r$—Y— groups (including any present in groups $R^5$ and $R^6$) equals the functionality m of group $R^1$. In addition, the generally preferred polymeric siloxy-containing groups are those in which alkylene groups A and B contain 50 to 100 equivalent percent of 1,2-ethylene units and 0 to 50 equivalent percent 1,2-propylene units (more preferably only 1,2-ethylene units), each polyoxyalkylene group contains 5 to 15 repeating oxy-alkylene units, and $R^4$ is $C_{12}$–$C_{20}$ alkanoyl (preferably stearoyl). The number of repeating siloxy units in each of groups $R^1$, $R^2$, and $R^3$ can independently vary, but except for compounds in which groups $R^2$ and $R^3$ are alkyl or —(CR$^a$R$^b$)$_q$— groups, the $R^1$, $R^2$, or $R^3$ groups are typically selected so that each contains approximately the same number of silicon atoms as the others. Suitable polymeric siloxy-containing starting materials are available, for example, from OSi Specialties, Inc.

The term "$C_1$–$C_{10}$ alkylene" refers to straight or branched chain difunctional aliphatic hydrocarbon groups having from 1 to 10 carbon atoms. Examples of $C_1$–$C_{10}$ alkylene are methylene, ethylene, propylene, butylene, pentylene, hexylene, heptylene, octylene, nonylene, and decylene, and the isomeric forms thereof.

The term "$C_1$–$C_{10}$ alkyl" refers to straight or branched chain aliphatic hydrocarbon groups having from 1 to 10 carbon atoms. Examples of $C_1$–$C_{10}$ alkyl are methyl, ethyl, propyl, butyl, pentyl, hexyl, heptyl, octyl, nonyl, decyl, and the isomeric forms thereof.

The term "$C_2$–$C_6$ alkenyl" refers to straight or branched chain aliphatic hydrocarbon groups having from 2 to 6 carbon atoms and one carbon-carbon double bond. Examples of $C_2$–$C_6$ alkenyl ethenyl, propenyl, butenyl, pentenyl, and hexenyl, including the various isomeric forms thereof.

The term "$C_5$–$C_7$ cycloalkyl" refers to cycloaliphatic hydrocarbon groups having from 5 to 7 carbon atoms. Examples of $C_5$–$C_7$ cycloalkyl are cyclopentyl, cyclohexyl, and cycloheptyl.

The term "$C_5$–$C_7$ cycloalkenyl" refers to cycloaliphatic hydrocarbon groups having from 5 to 7 carbon atoms and one carbon-carbon double bond within the ring. Examples of $C_5$–$C_7$ cycloalkenyl are cyclopentenyl, cyclohexenyl, and cycloheptenyl, including the various isomeric forms thereof.

The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof.

The term "$C_2$–$C_{30}$ alkanoyl" refers to straight or branched chain alkanoyl groups having from 2 to 7 carbon atoms. Examples of $C_2$–$C_{30}$ alkanoyl are acetyl, propanoyl, butanoyl, pentanoyl, hexanoyl, heptanoyl, lauroyl, myristoyl, palmitoyl, stearoyl, eicosanoyl, lignoceroyl, and the isomeric forms thereof.

The term "$C_3$–$C_{30}$ alkenoyl" refers to straight or branched chain alkanoyl groups having from 3 to 7 carbon atoms and one carbon-carbon double bond. Examples of $C_3$–$C_{30}$ alkenoyl are propenoyl, butenoyl, pentenoyl, hexenoyl, heptenoyl, oleoyl, elaidoyl, brassidoyl, and erucoyl, including the various isomeric forms thereof.

The term "$C_7$–$C_{11}$ aroyl" refers to benzoyl and 1- or 2-naphthoyl, as well as to phenyl and naphthyl groups substituted with alkyl, alkoxy, halogen, hydroxy, alkoxycarbonyl, aryloxycarbonyl, cyano, and nitro as defined herein.

Examples of halogen are fluorine, chlorine, bromine, and iodine.

Examples of suitable anions Q$^-$ include halides (especially chloride), nitrate, sulfate (as well bisulfate), phosphate (as well as hydrogen phosphate and dihydrogen phosphate), mesylate, p-toluenesulfonate, cyanate, thiocyanate, and the like.

Suitable starting materials for the preparation of the compounds of this invention include silanes containing three alkoxy groups and having the general formula X—R—Si(OAlk)$_3$, where each Alk is independently $C_1$–$C_{10}$ alkyl (preferably $C_1$–$C_4$ alkyl, and more preferably ethyl) and X and R are defined as above for formula (I) (but are preferably H$_2$N— and 1,3-propylene, respectively). Compounds of this type are commercially available, for example, from OSi Specialties, Inc. Such alkoxylated silanes are highly reactive toward the primary hydroxy groups present in alcohols, diols, carboxylic acids, and the like. Although all three —OAlk groups are potentially reactive, the preferred compounds are those in which only one or two of these alkoxy groups are displaced during subsequent reaction with a reactive polymeric siloxy-containing compound (that is, during the "capping" reaction described below).

Simple capping can be accomplished, for example, by reaction of a silane starting material of the formula X—R—Si(OAlk)$_3$ with a primary alcohol R$^x$OH (wherein R$^x$ represents R$^1$, R$^2$, or R$^3$) in amounts such that one —OAlk group of the silane is replaced by R$^x$ to form an intermediate compound represented by formula (II):

Such silanes become more resistant to replacement reactions as the number of carbon atoms in R$^x$ increases. Thus, when compounds such as those of formula (II) are formed, it becomes possible to bridge two primary hydroxyl-bearing species without significant polymerization or other such undesired reactions. For example, when R$^x$ is an alkyl group R$^2$, subsequent reaction of a compound of formula (II) with at least two equivalents of a hydroxy-containing siloxy compound can provide compounds of formula (I) of the invention in which R$^1$ and R$^3$ independently represent polymeric siloxy-containing groups (preferably where R$^1$ and R$^3$ are identical). When either or both of groups R$^2$ and $R^3$ of formula (I) are to be butyl or larger alkyl groups, it is possible to eliminate the need for an additional displacement step by using as starting material a compound of formula X—R—Si(OAlk)$_3$ in which at least one Alk is a butyl or larger alkyl group.

A particularly preferred compound of formula (II) is represented by formula (IIa):

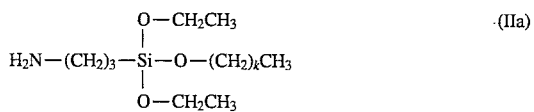

in which k is an integer of from 3 to 9 (preferably at least 4). Compounds of formula (IIa) can react with two equivalents of a hydroxy-functional polymeric siloxy-containing precursor $R^{x}OH$, wherein $R^{x}$ represents monofunctional $R^1$ and $R^3$ in which the terminal —Z—(O—B)$_s$—OR$^4$ groups are trimethylsilyloxy groups (i.e., terminal groups in which Z is a direct bond, s is 0, and $R^4$ is trimethylsilyl) and the $R^5$ and $R^6$ groups in $R^1$ are groups other than —Y—(O—A)$_r$—, to give bridged compounds of formula (Ia) of the invention:

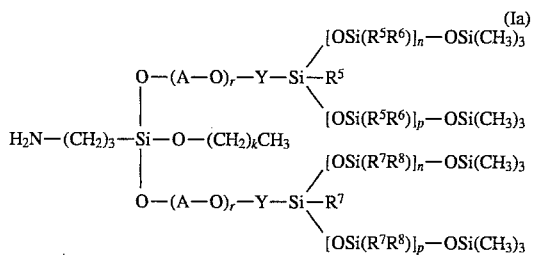

When the hydroxy-functional polymeric siloxy-containing precursor contains more than one potentially reactive hydroxy group, undesirably complex mixtures can be avoided during the reaction with compound (IIa) by first acylating all but one hydroxy position of the precursor (such that all but one hydroxy group will be a formyl, alkanoyl, alkenoyl, aroyl, or trialkylsilyl group). For example, typical hydroxy-functional polymeric siloxy-containing precursors have up to about 20 hydroxy groups (preferably up to 10 hydroxy groups, more preferably about 6 hydroxy groups), all but one of which are preferably acylated before reaction with compounds of formula (II). Suitable silanol alkoxylates are commercially available from OSi Specialties, Inc.

Preferred embodiments of bridged compounds (Ia) are those having polymeric siloxy-containing groups in which one or more silicon atoms (preferably no more than half) are substituted with propylene groups to which are attached polyoxyethylene chains capped with a long-chain alkanoyl group (preferably stearoyl) and can be represented by formula (Ia'):

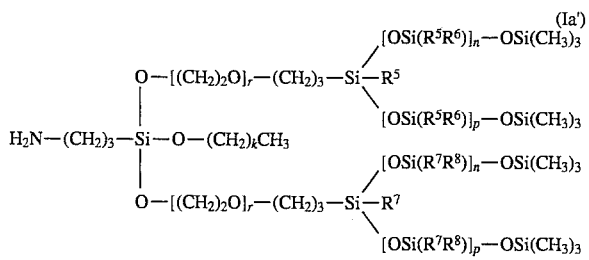

in which at least a portion (preferably about 10 to about 50%) of the $R^5$, $R^6$, $R^7$, and $R^8$ groups are —(CH$_2$)$_3$—[O—(CH$_2$)$_2$]$_s$—O—OC—(CH$_2$)$_{16}$CH$_3$ and the remainder of the $R^5$, $R^6$, $R^7$, and $R^8$ groups are alkyl (preferably methyl), k is from 3 to 9 (preferably at least 4), the sum n+p is from 20 to 100 (preferably 30 to 50), and r is from 1 to 20 (preferably 5 to 15).

Although generally less preferred, it is also possible to prepare bridged compounds of formula (Ia) of the invention using simpler hydroxy-functional polymeric siloxy-containing precursors based on disilanols of the formula HO—[Si(R$^9$R$^{10}$)O]$_{n'}$—H in which $R^9$ and $R^{10}$ are alkyl groups (preferably methyl) and n' is an integer of from 30 to 50 (preferably 40 to 45). A particularly preferred bridged compound of this type is represented by formula (Ia"):

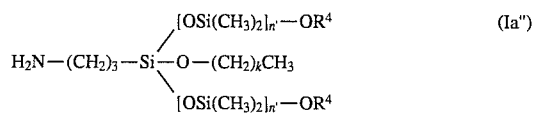

in which k is from 3 to 9 (preferably at least 4), n' is from 30 to 50 (preferably 40 to 45), and $R^4$ is a long-chain alkanoyl group (preferably stearoyl).

It is also possible to carry out the initial reaction of X—R—Si(OAlk)$_3$ with diols of the formula HO—(CR$^a$R$^b$)$_8$—OH to obtain a different type of intermediate represented by formula (III):

Subsequent reaction with a suitable hydroxy-containing siloxy compound (i.e., $R^1$OH) can thus provide compounds corresponding to formula (I) of the invention in which $R^2$ and $R^3$ taken together are —(CR$^a$R$^b$)$_q$— and $R^1$ is a polymeric siloxy-containing group.

A particularly preferred compound of formula (III) is represented by formula (IIIb):

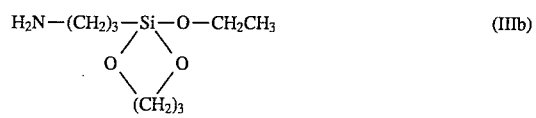

The six-membered ring of compound (IIIb) is particularly stable, especially when compared to the relatively labile ethoxy group. The compound of formula (IIIb) can react, for example, with a monofunctional hydroxy-containing polymeric siloxy-containing precursor (that is, in which m is 1) to give compounds of formula (Ib) of the invention:

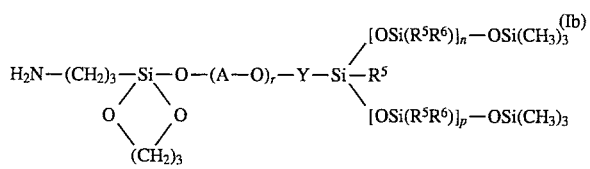

When the hydroxy-functional polymeric siloxy-containing precursor contains more than one potentially reactive hydroxy group, undesirably complex mixtures can be avoided during the reaction with compound (IIIb) by first acylating all but one hydroxy position of the precursor (such that all but one hydroxy group will be a formyl, alkanoyl, alkenoyl, aroyl, or trialkylsilyl group). For example, typical hydroxy-functional polymeric siloxy-containing precursors have up to about 20 hydroxy groups (preferably up to 10 hydroxy groups, more preferably about 6 hydroxy groups), all but one of which are preferably acylated before reaction with compounds of formula (II). However, although generally not preferred, it is possible to control the reaction conditions and stoichiometry so as to obtain compounds analogous to those of formula (Ib) in which the hydroxy groups of the precursor, and thus the product, are not acylated.

Preferred embodiments of compound (Ib) are those having polymeric siloxy-containing groups in which one or more silicon atoms (preferably no more than half) are substituted with propylene groups to which are attached polyoxyethylene chains capped with a long-chain alkanoyl group (preferably stearoyl) and is represented by formula (Ib'):

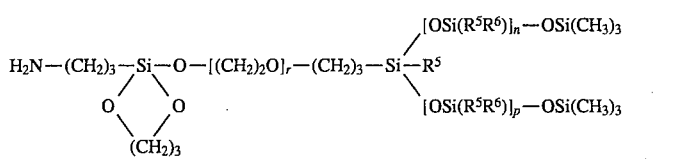
(Ib')

in which at least a portion (preferably about 10 to about 50%) of the $R^5$ and $R^6$ groups are —$(CH_2)_3$—[O—$(CH_2)_2$]$_s$—O—OC—$(CH_2)_{16}CH_3$ (or, less preferably, —$(CH_2)_3$—[O—$(CH_2)_2$]$_s$—OH) and the remainder of the $R^5$ and $R^6$ groups are alkyl (preferably methyl), the sum n+p is from 20 to 100 (preferably 30 to 50), and r is from 1 to 20 (preferably 5 to 15).

Although generally less preferred, it is also possible to prepare compounds of formula (Ia) of the invention using simpler hydroxy-functional polymeric siloxy-containing precursors based on disilanols of the formula HO—[Si($R^9R^{10}$)O]$_{n'}$—H in which $R^9$ and $R^{10}$ are alkyl groups (preferably methyl) and n' is an integer of from 30 to 50 (preferably 40 to 45). A particularly preferred compound of this type is represented by formula (Ib"):

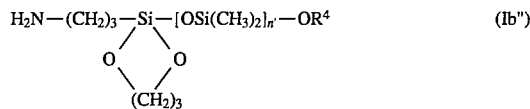
(Ib")

in which n' is from 30 to 50 (preferably 40 to 45), and $R^4$ is a long-chain alkanoyl group (preferably stearoyl).

The compounds of the present invention are particularly useful as lubricants for textile wet processing. The preferred fully O-acylated and/or O-silylated compounds of the invention (that is, those in which $R^4$ groups are acyl and/or silyl groups) do not contain exposed hydroxyl groups that can undergo undesirable polymerizations and other side reactions during their use as lubricants (for example, when dyeing treated fibers with reactive dyestuffs) and, when prepared as discussed above using precursors in which all but one hydroxy group are acylated before the final preparative step, are also less likely to consist of undesirably complex mixtures. Furthermore, amino compounds according to the invention in which X is —$NH_2$ (or N-substituted derivatives thereof) are protonated in acidic aqueous medium and thus promote electrostatic attraction toward negatively charged substrates common in textile applications, such as cellulosics, and are thus particularly preferred. Corresponding quaternary ammonium compounds, which can be prepared, for example, by alkylation of the amino compounds of the invention (or even amino-containing precursors), are also suitable but generally less preferred.

The lubricants of the invention provide softening and crease resistance in the preparation, dyeing, and aftertreatment of woven and knitted goods made of cellulosic, polyamide, wool, and polyester fibers, as well as blends of such fibers.

The lubricants of the invention are stable to metal compounds found in hard water, alkalis, organic acids, and various salts such as sodium chloride and sodium sulfate that are sometimes found in dyeing solutions and dispersions, even at temperatures of up to about 130° C.

The lubricants of the invention can be applied using known dyeing machines. High pressure, high turbulence systems, in which high electrolyte concentrations are often present because of the addition of salts or alkalis in dyeing or preparation (that is, bleaching) processes, are particularly susceptible to foam generation that can cause spotting. The lubricants of the invention are especially suited to such systems.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all percentages are percentages by weight.

EXAMPLES

EXAMPLE 1

A mixture of 342 g (1.55 moles) of γ-aminopropyltrimethoxysilane available as SILQUEST A-1100 from OSi Specialties) and 156 g (1.55 moles) of hexanol (molar ratio of 1:1) was heated at reflux (about 115° to 125° C.) for four to six hours, thereby forming an intermediate product having the formula

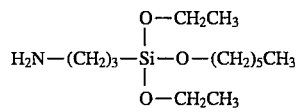

In a separate container, a mixture of 156.6 g (10 moles) of stearic acid and 443.4 g (20 moles) of a polyoxyethylene-substituted polydimethylsiloxane available as SILWET L-7604 (CAS No. 68937-54-2) from OSi Specialties and having the general formula

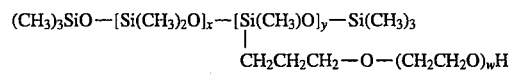

[in which the two types of bracketed siloxane segments are present in an essentially random mixture of branched and unbranched segments rather than a block copolymer and each molecule has a polyoxyethylene/propylene content of about 56% by weight (and a silicone backbone content of about 44% by weight), approximately six hydroxyl groups (i.e., y is about 6), and a molecular weight of 4000 (see product bulletin "SILWET Surfactants" from Union Carbide (1982)] was heated at 115° to 125° C. for two to three hours with removal of water, thereby forming a second intermediate product in which all but one hydroxyl group was esterified.

A 7.20 g (0.027 mole) portion of the first intermediate product was mixed with 596.4 g (0.056 mole) (that is, two equivalents) of the second intermediate and the mixture was heated with stirring at 110° to 120° C. for two to three hours with removal of ethanol, thereby forming 602 g of a compound according to the invention having the general formula $$CH_3(CH_2)_{16}CO-(OCH_2CH_2)_w-O-CH_2CH_2CH_2$$
$$(CH_3)_3SiO-[Si(CH_3)_2O]_x-[Si(CH_3)O]-[Si(CH_3)O]_{y-1}-Si(CH_3)_3$$
$$O(CH_2CH_2O)_w-(CH_2)_3$$
$$H_2N-(CH_2)_3-Si-O-(CH_2)_5CH_3$$
$$O(CH_2CH_2O)_w-(CH_2)_3$$
$$(CH_3)_3SiO-[Si(CH_3)_2O]_x-[Si(CH_3)O]-[Si(CH_3)O]_{y-1}-Si(CH_3)_3$$
$$CH_3(CH_2)_{16}CO-(OCH_2CH_2)_w-O-CH_2CH_2CH_2$$

in which, again, the bracketed siloxane segments are present in an essentially random mixture of branched and unbranched segments rather than a block copolymer (that is, a compound of the general type represented by formula (Ia') of the invention in which k is 5).

EXAMPLE 2

The first step of Example 1 was repeated using 1,3-propanediol instead of hexanol, thereby giving a first intermediate product having the formula

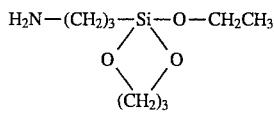

A 20.7 g (0.081 mole) portion of this intermediate product was mixed with 279.3 g (0.079 mole) (that is, one equivalent) of the polyoxyethylene-substituted polydimethylsiloxane SILWET L-7604 and the mixture was heated with stirring at 110° to 120° C. for two to three hours with removal of ethanol, thereby forming 295 g of a second intermediate having the general formula

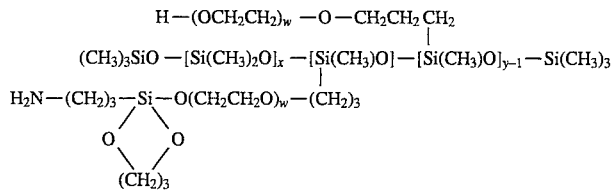

in which (as mentioned in Example 1) the bracketed siloxane segments are present in an essentially random mixture of branched and unbranched segments rather than a block copolymer. The second intermediate is itself a compound according to the invention in which the polyoxyethylene side chains are terminated with hydroxyl groups.

A 225.6 g (0.053 mole) portion of the second intermediate was allowed to react with five equivalents of stearic acid at 115° to 125° C. for three hours with removal of water, thereby forming 292 of a compound according to the invention having the general formula

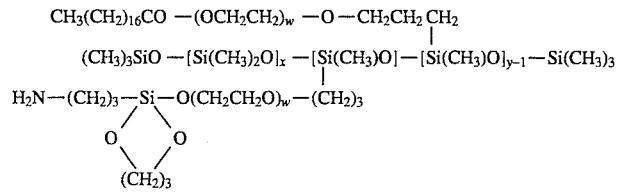

in which, again, the bracketed siloxane segments are present in an essentially random mixture of branched and unbranched segments rather than a block copolymer (that is, a compound of the general type represented by formula (Ib') of the invention).

Performance Parameters

Performance parameters for the lubricants of the invention of Examples 1 and 2 were determined by the following methods. Although the second intermediate of Example 1 is not a compound according to the invention, its performance parameters were also determined.

Affinity to Substrate

Affinity of the lubricants for cotton was determined by dyeing cotton swatches with 2.0% LEVAFIX Red E6BA (available from Bayer Corporation) in the presence of 60 g/L of sodium chloride, 6 g/L of sodium carbonate, 0.5 g/L of sodium bicarbonate, and 2.0 g/L of each test sample at 38°–60° C. for 45 minutes using a 10:1 liquor ratio. By using an excess of lubricant in this manner, retardation of dyeing, as indicated by reduced shade strength relative to an untreated control (relative shade strength of 100%), reflects an increased affinity of lubricant for the cotton substrate. Test results are reported in the Table.

Electrolyte Stability

Electrolyte stability was determined using aqueous test mixtures containing a 20% dispersion of each lubricant and varying amounts of sodium sulfate. Each test mixture was heated to about 49° C. and sheared at high speed in a blender for two minutes. Each blended mixture was poured into a clean glass beaker and observed for incompatibility or precipitation. The sodium sulfate concentration at which instability occurred (that is, the point at which precipitation on the walls of the glass beaker was observed) is indicative of electrolyte instability. Test results are reported in the Table.

Friction

Static and dynamic coefficients of friction were determined for treated and untreated yarn.

Static coefficients of friction (i.e., for adherence friction) were determined by measuring the force needed to start the movement of treated (or untreated) thread against identically treated (or untreated) threads. In this method, a pair of threads attached to a freely movable frame of known mass is placed perpendicularly across another pair of threads attached to a support that can be tilted upward along the length of the second pair of threads. The static coefficient of friction is calculated from the angle at which the force of the movable frame overcomes the force of static friction (i.e., where the threads of the movable frame begin to slide along the tilted threads).

Dynamic coefficients of friction (i.e., for gliding friction) were determined using an F-Meter instrument available from Rothschild (Germany). In this method, the frictional force of a treated (or untreated) thread passing over a polished metal peg at a constant speed is measured.

Test results are reported in the Table.

Crease Resistance

Crease resistance was determined using a laboratory winch beck through which was run continuous loops of pleated PES/CO 65/35 (i.e., 65% polyester and 35% cotton) poplin strips having a width and length selected to insure smooth running without tension or longitudinal creases. The fabric strips were run for five minutes through boiling aqueous solutions containing no test compound (comparison) and 0.5, 1.0, 1.5, 2.0, 2.5, 3.0, 4.0, and 5.0 g/L of each test compound. The fabric strips were then dried and the treated strips were compared with untreated strips. Crease resistance was evaluated in terms of the visibility of pleats relative to the comparison strip. Optimum levels for each test compound are reported in the Table.

TABLE

| | Performance parameters for Examples 1 and 2 | | | |
|---|---|---|---|---|
| | Example 1 | | Example 2 | |
| | Second intermediate (comparison) | Product | Second intermediate | Product |
| Shade strength (%) | 89 | 65 | 76 | 65 |
| Electrolyte stability | 75–80 | 135–140 | 65–75 | 145–150 |
| Coefficient of friction | | | | |
| Static | 0.27 | 0.21 | 0.19 | 0.22 |
| Dynamic | 0.76 | 0.80 | 0.85 | 0.82 |
| Crease resistance (optimum level, g/L) | 1.0 | 1.0 | 1.0 | 4.0 |

The compounds of the invention prepared in Examples 1 and 2 exhibited good affinity to cotton and electrolytic stability and provided reduced friction and crease mark formation in cotton. Although the second intermediate of Example 1 (not according to the invention) provided comparable dynamic friction and crease resistance properties, the compounds of the invention exhibited generally superior substrate affinity, electrolyte stability, and static friction.

What is claimed is:

1. A water-dispersible compound having the formula:

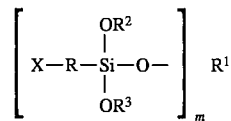

wherein

R is $C_1$–$C_{10}$ alkylene;

$R^1$ is an m-functional linear or branched polymeric siloxy-containing group having the formula

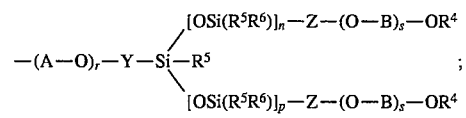

$R^2$ and $R^3$ are independently $C_1$–$C_{10}$ alkyl or linear or branched polymeric siloxy-containing groups having the formula

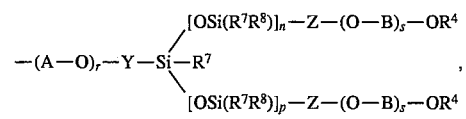

with the proviso that at least one of $R^2$ and $R^3$ is not $C_1$–$C_{10}$ alkyl, or $R^2$ and $R^3$ taken together are —$(CR^aR^b)_q$— (wherein $R^a$ and $R^b$ are independently hydrogen or $C_1$–$C_6$ alkyl, and q is 2, 3, or 4);

$R^4$ is hydrogen, formyl, $C_2$–$C_{30}$ alkanoyl, $C_3$–$C_{30}$ alkenoyl, $C_7$–$C_{11}$ aroyl (optionally substituted in one or more aromatic rings), or tri($C_1$–$C_6$ alkyl)silyl;

$R^5$ and $R^6$ are independently $C_1$–$C_6$ alkyl, $C_1$–$C_6$ alkoxy, —Z—(O—B)$_s$—OR$^4$, or —Y—(O—A)$_r$— (with the proviso that the total number of —Y—(O—A)$_r$— groups equals m);

$R^7$ and $R^8$ are independently $C_1$-$C_6$ alkyl, $C_1$-$C_6$ alkoxy, or —Z—(O—B)$_s$—OR$^4$, X is hydrogen, $C_1$-$C_6$ alkyl, $C_2$-$C_6$ alkenyl, $C_5$-$C_7$ cycloalkyl, $C_5$-$C_7$ cycloalkenyl, —NR$^c$R$^d$ (wherein R$^c$ and R$^d$ are independently hydrogen, $C_1$-$C_6$ alkyl, or $C_5$-$C_7$ cycloalkyl), —NR$^c$R$^d$R$^{e+}$Q$^-$ (wherein R$^c$, R$^d$, and R$^e$ are independently hydrogen, $C_1$-$C_6$ alkyl, or $C_5$-$C_7$ cycloalkyl and Q$^-$ is an anion), —OR$^f$ (wherein R$^f$ is hydrogen, $C_1$-$C_6$ alkyl, or $C_5$-$C_7$ cycloalkyl), —SR$^g$ (wherein R$^g$ is hydrogen, $C_1$-$C_6$ alkyl, or $C_5$-$C_7$ cycloalkyl), —NH—CO—NH—R$^h$ (wherein R$^h$ is hydrogen, $C_1$-$C_6$ alkyl, or $C_5$-$C_7$ cycloalkyl), —O—CO—NH—R$^i$ (wherein R$^i$ is hydrogen, $C_1$-$C_6$ alkyl, or $C_5$-$C_7$ cycloalkyl), —NH—CO—O—R$^j$ (wherein R$^j$ is hydrogen, $C_1$-$C_6$ alkyl, or $C_5$-$C_7$ cycloalkyl), —CN, or halogen;

A and B are independently $C_1$-$C_4$ alkylene;

Y and Z are independently a direct bond or $C_1$-$C_4$ alkylene;

m is an integer of from 1 to 20;

r and s are independently an integer of from 0 to 20; and n and p are each integers of from 0 to 100 with the proviso that the total (n+p) is from 10 to 100.

2. A water-dispersible compound according to claim 1 having the formula:

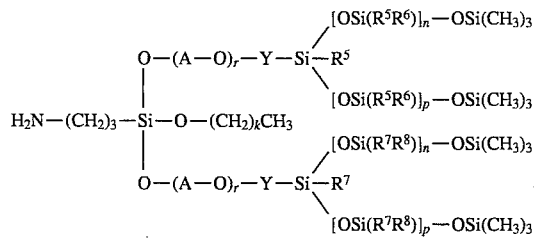

wherein $R^5$, $R^6$, $R^7$, and $R^8$ are independently $C_1$-$C_6$ alkyl, $C_1$-$C_6$ alkoxy, or —Z—(O—B)$_s$—OR$^4$ in which R$^4$ is hydrogen, formyl, $C_2$-$C_{30}$ alkanoyl, $C_3$-$C_{30}$ alkenoyl, $C_7$-$C_{11}$ aroyl (optionally substituted in one or more aromatic rings), or tri($C_1$-$C_6$ alkyl)silyl;

A and B are independently $C_1$-$C_4$ alkylene;

Y and Z are independently a direct bond or $C_1$-$C_4$ alkylene;

r and s are independently an integer of from 0 to 20; and n and p are each integers of from 0 to 100 with the proviso that the total (n+p) is from 10 to 100.

3. A water-dispersible compound according to claim 1 having the formula:

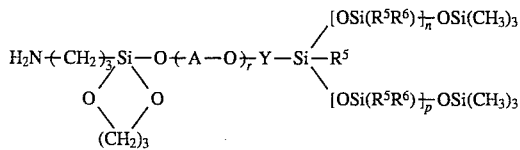

wherein $R^5$ and $R^6$ are independently $C_1$-$C_6$ alkyl, $C_1$-$C_6$ alkoxy, or —Z—(O—B)$_s$—OR$^4$ in which R$^4$ is hydrogen, formyl, $C_2$-$C_{30}$ alkanoyl, $C_3$-$C_{30}$ alkenoyl, $C_7$-$C_{11}$ aroyl (optionally substituted in one or more aromatic rings), or tri($C_1$-$C_6$ alkyl)silyl;

A and B are independently $C_1$-$C_4$ alkylene;

Y and Z are independently a direct bond or $C_1$-$C_4$ alkylene;

r and s are independently an integer of from 0 to 20; and n and p are each integers of from 0 to 100 with the proviso that the total (n+p) is from 10 to 100.

4. A water-dispersible compound according to claim 1 having the formula:

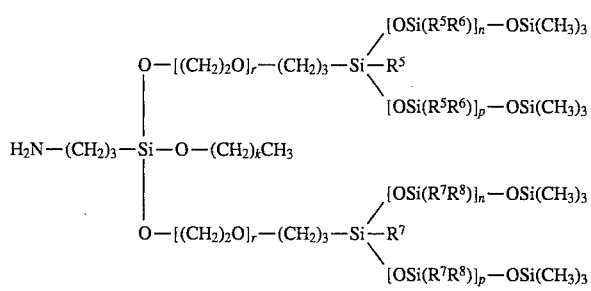

wherein about 10 to about 50% of the $R^5$, $R^6$, $R^7$, and $R^8$ groups are —(CH$_2$)$_3$—[O—(CH$_2$)$_2$]$_s$—O—OC—(CH$_2$)$_{16}$CH$_3$ and the remainder of the $R^5$, $R^6$, $R^7$, and $R^8$ groups are alkyl, k is from 3 to 9, the sum n+p is from 20 to 100, and r is from 1 to 20.

5. A water-dispersible compound according to claim 1 having the formula:

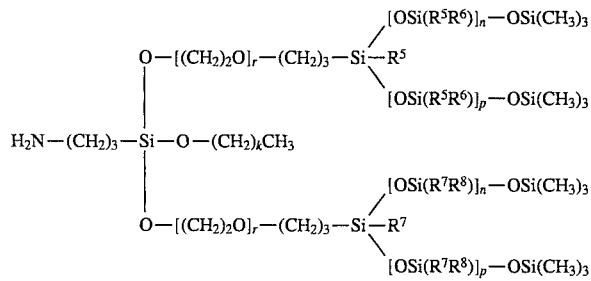

wherein about 10 to about 50% of the $R^5$, $R^6$, $R^7$, and $R^8$ groups are —(CH$_2$)$_3$—[O—(CH$_2$)$_2$]$_s$—O—OC—(CH$_2$)$_{16}$CH$_3$ and the remainder of the $R^5$, $R^6$, $R^7$, and $R^8$ groups are methyl, k is from 3 to 9, the sum n+p is from 30 to 50, and r is from 5 to 15.

6. A water-dispersible compound according to claim 1 having the formula:

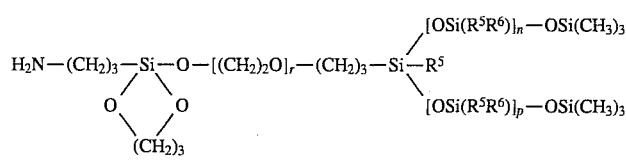

wherein about 10 to about 50% of the $R^5$ and $R^6$ groups are —$(CH_2)_3$—[O—$(CH_2)_2]_s$—O—OC—$(CH_2)_{16}CH_3$ or —$(CH_2)_3$—[O—$(CH_2)_2]_s$—OH and the remainder of the $R^5$ and $R^6$ groups are alkyl, the sum n+p is from 20 to 100, and r is from 1 to 20.

7. A water-dispersible compound according to claim 1 having the formula:

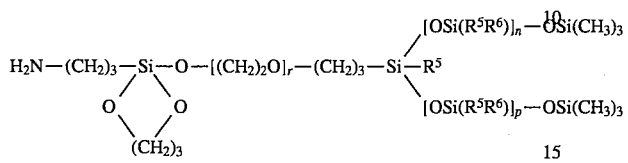

wherein about 10 to about 50% of the $R^5$ and $R^6$ groups are —$(CH_2)_3$—[O—$(CH_2)_2]_s$—O—OC—$(CH_2)_{16}CH_3$ or —$(CH_2)_3$—[O—$(CH_2)_2]_s$—OH and the remainder of the $R^5$ and $R^6$ groups are methyl, the sum n+p is from 30 to 50, and r is from 5 to 15.

* * * * *